(12) United States Patent
Takai

(10) Patent No.: US 6,928,165 B1
(45) Date of Patent: Aug. 9, 2005

(54) COMMUNICATION SYSTEM USING DIGITAL WATERMARK FOR SYNCHRONIZING MULTIPLEXED TEXT DATA TO VIDEO FRAMES

(75) Inventor: Kazuhito Takai, Tokyo (JP)

(73) Assignee: NEC Corporation, (JP)

( * ) Notice: Subject to any disclaimer, the term of this patent is extended or adjusted under 35 U.S.C. 154(b) by 969 days.

(21) Appl. No.: 09/628,824

(22) Filed: Jul. 31, 2000

(30) Foreign Application Priority Data

Jul. 30, 1999 (JP) ................................. 11-216410

(51) Int. Cl.⁷ .......................................... H04N 7/167
(52) U.S. Cl. ..................... 380/201; 380/203; 380/210; 380/212; 380/217; 713/150; 713/165; 713/176; 713/200; 705/57
(58) Field of Search ................ 348/468; 380/201–204, 380/210, 212, 217; 370/487; 713/150, 165, 713/176, 200; 705/57

(56) References Cited

U.S. PATENT DOCUMENTS

| | | | | |
|---|---|---|---|---|
| 4,920,407 A * | 4/1990 | Stoddard | ..................... | 348/718 |
| 5,742,352 A * | 4/1998 | Tsukagoshi | .................. | 348/468 |
| 6,434,322 B1 * | 8/2002 | Kimura et al. | ................. | 386/94 |
| 6,567,018 B2 * | 5/2003 | Inokuchi et al. | .............. | 341/50 |
| 6,571,220 B1 * | 5/2003 | Ogino et al. | ................... | 705/51 |
| 6,611,607 B1 * | 8/2003 | Davis et al. | ................. | 382/100 |
| 6,621,933 B2 * | 9/2003 | Chung et al. | ............... | 382/233 |
| 6,738,493 B1 * | 5/2004 | Cox et al. | .................... | 382/100 |
| 6,802,074 B1 * | 10/2004 | Mitsui et al. | .................. | 725/25 |
| 6,812,864 B2 * | 11/2004 | Koto et al. | ..................... | 341/50 |
| 6,850,619 B1 * | 2/2005 | Hirai | ........................... | 380/203 |
| 6,865,747 B1 * | 3/2005 | Mercier | ........................ | 725/94 |

FOREIGN PATENT DOCUMENTS

| | | | | |
|---|---|---|---|---|
| JP | 10-155151 | 6/1998 | | |
| JP | 10-234016 | 9/1998 | | |
| JP | 11-27641 | 1/1999 | | |
| WO | WO04019273 A1 * | 3/2004 | ............ | H04N 1/32 |
| WO | WO04066206 A1 * | 8/2004 | ............ | G06T 1/00 |
| WO | WO04066626 A1 * | 8/2004 | ............ | H04N 7/08 |

OTHER PUBLICATIONS

Barni et al, Cartographic Image Watermark Using Text-Based Normalization, 2001, IEEE, pagews 231-236.*
Japanese Office Action dated Jul. 7, 2003 (w/English translation of relevant portion).

* cited by examiner

*Primary Examiner*—Ayaz Sheikh
*Assistant Examiner*—Aravind K Moorthy
(74) *Attorney, Agent, or Firm*—Dickstein, Shapiro, Morin & Oshinsky, LLP.

(57) ABSTRACT

A digital video communication system includes, at a source site, an embedding circuit for embedding a digital watermark in a digital video stream to produce a watermarked digital video stream, and a multiplexer for multiplexing a text data stream with the watermarked digital video stream to produce a multiplexed signal. At a sink site, the system includes a demultiplexer for demultiplexing the multiplexed signal for recovering a watermarked digital video stream and a text data stream. A digital watermark detector is provided for detecting the digital watermark embedded in the recovered digital video stream. A synchronizer responds to the detected digital watermark for synchronizing the recovered text data stream to the recovered video stream.

22 Claims, 5 Drawing Sheets

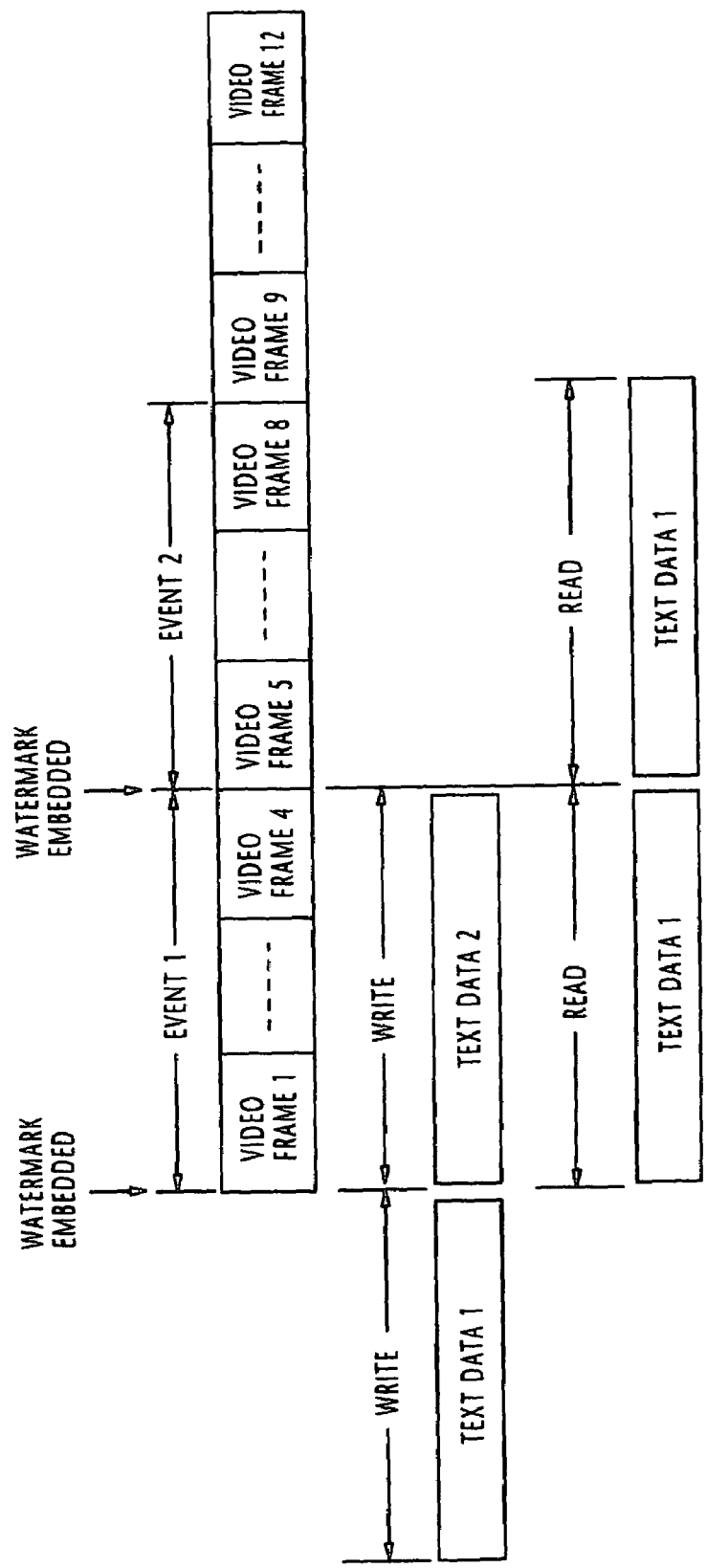

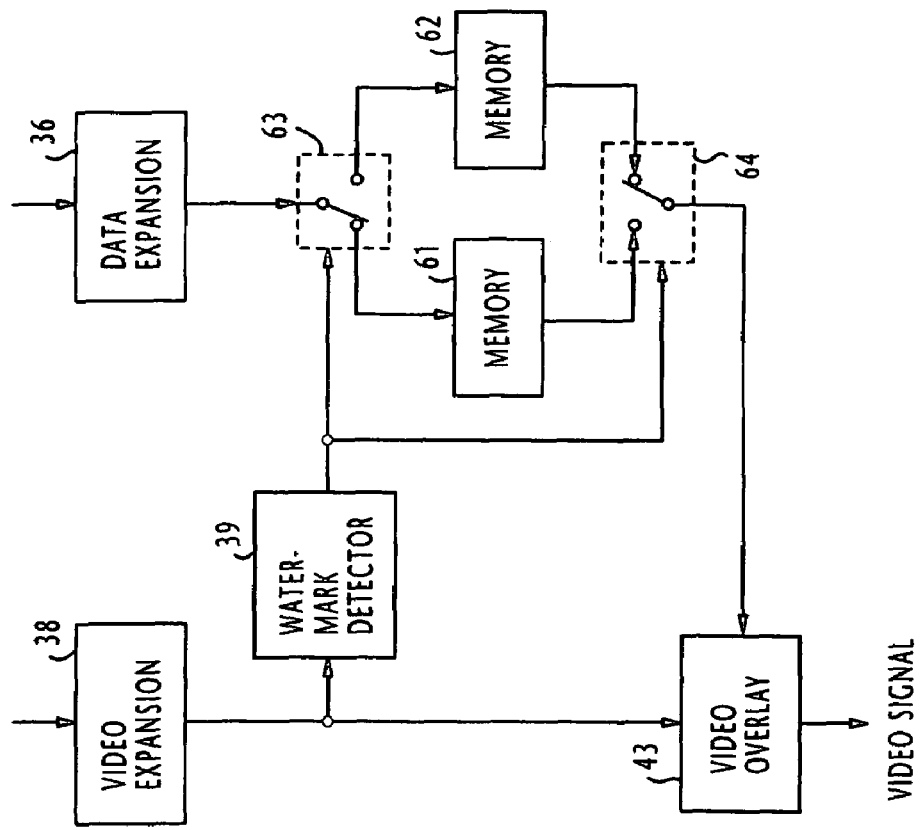

COMMUNICATION SYSTEM USING DIGITAL WATERMARK FOR SYNCHRONIZING MULTIPLEXED TEXT DATA TO VIDEO FRAMES

BACKGROUND OF THE INVENTION

1. Field of the Invention

The present invention relates generally to video communication systems and more specifically to a copy-protect video communication system. The present invention is particularly useful for standard digital television broadcasting.

2. Description of the Related Art

For standard digital television broadcasting, it is contemplated to multiplex text data with a video signal using vertical blanking intervals. For this purpose, a number of text data are multiplexed in a video program and each text data stream is associated with a particular series of video frames, or "events" so that each text appears on the screen of television receivers simultaneously with the associated event. In order for television receivers to synchronize a text data stream with the associated event, it is necessary for the broadcasting station to transmit timing information along with a video signal, as disclosed in Japanese Laid-Open Patent Application 11-27641. However, the use of timing information represents a waste of resource of the video frequency spectrum.

On the other hand, digital (or electronic) watermark is currently receiving attention because of its ability to detect illegal duplication of video programs and a number of techniques have been developed for hiding (embedding) identifying information into programs to be copy-protected.

SUMMARY OF THE INVENTION

It is therefore an object of the present invention to provide a system and method for synchronizing text data streams to "events" of digital video stream without using timing information.

The stated object is obtained by embedding a digital watermark in the transmitted video stream and detecting the digital watermark in the received video stream and using it as a timing signal for synchronizing a text data stream to associated video frames.

According to one aspect of the present invention, there is provided a digital video communication system comprising, at a source site, an embedding circuit for embedding a digital watermark in a digital video stream to produce a watermarked digital video stream, and a multiplexer for multiplexing a text data stream with the watermarked digital video stream to produce a multiplexed signal. At a sink site, the system includes a demultiplexer for demultiplexing the multiplexed signal for recovering a watermarked digital video stream and a text data stream. A digital watermark detector is provided for detecting the digital watermark embedded in the recovered digital video stream. A synchronizer responds to the detected digital watermark for synchronizing the recovered text data stream to the recovered video stream.

According to a second aspect, the present invention provides a digital video communication method comprising the steps of embedding a digital watermark in a digital video stream to produce a watermarked digital video stream, multiplexing a text data stream with the watermarked digital video stream to produce a multiplexed signal, demultiplexing the multiplexed signal for recovering a watermarked digital video stream and a text data stream, detecting the digital watermark embedded in the recovered digital video stream and using the detected digital watermark as a timing signal for reading the text data from said storage medium, and synchronising the recovered text data stream with the recovered digital video stream in response to the detected digital watermark.

BRIEF DESCRIPTION OF THE DRAWINGS

The present invention will be described in further detail with reference to the accompanying drawings, in which:

FIG. 6 is a timing diagram of a video stream along with text data which occur at such timing that write and read operations are performed simultaneously for different text data by using switched memories; and FIG. 7 is a block diagram of a third modified embodiment of the present invention associated with FIG. 6.

DETAILED DESCRIPTION

Figure 1:
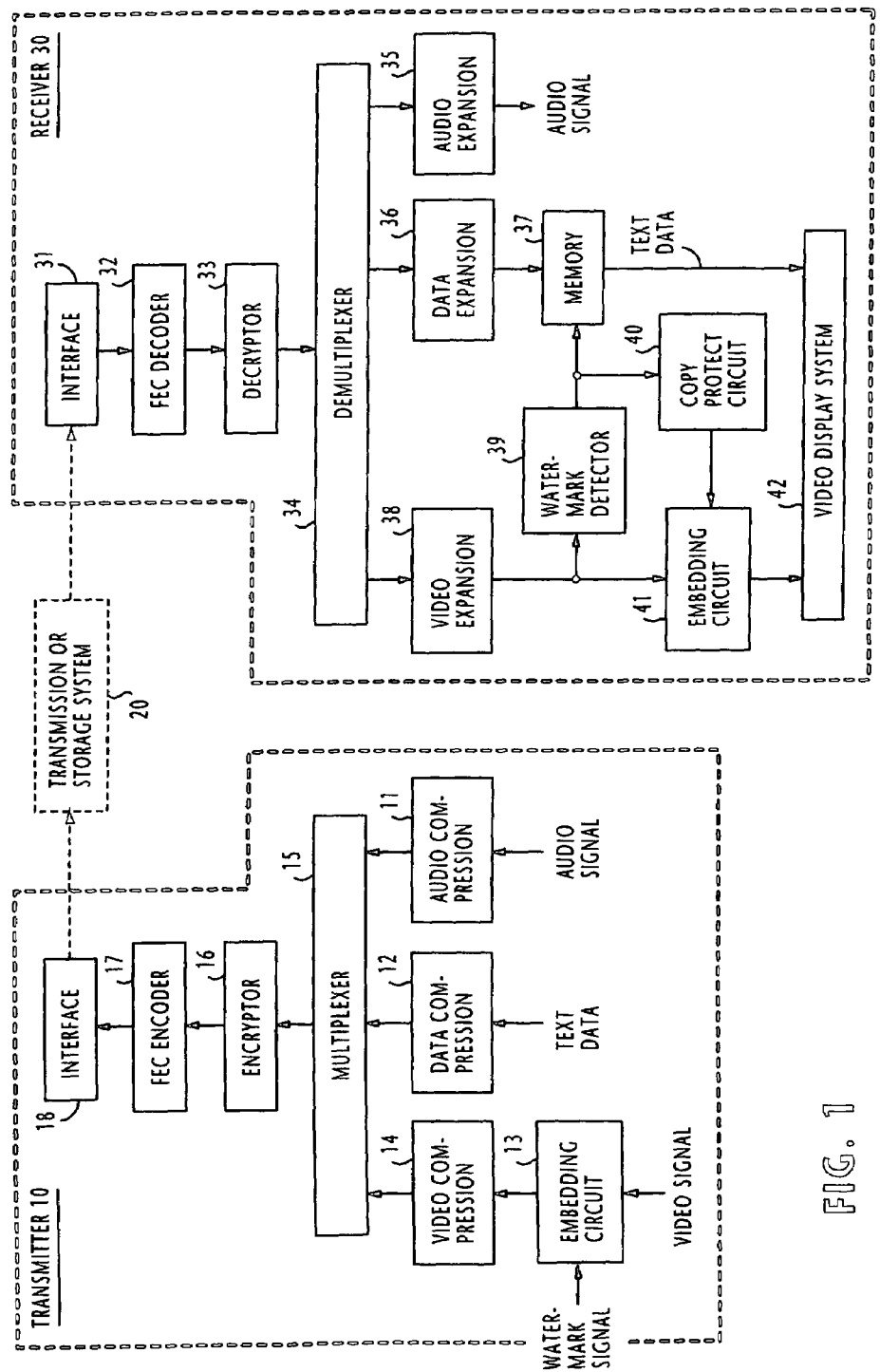
FIG. 1 is a block diagram of a digital video communication system according to the present invention.

In FIG. 1, a video communication system according to one embodiment of the present invention is comprised by a transmitter 10 which transmits a composite digital video signal through a noisy environment such as a cable or a wireless transmission system (including satellite and terrestrial broadcasting) or a storage system such as video cassette recorder 20 to a receiver 30.

At the transmitter 10, a digital audio stream is processed by an audio compression circuit 11 and a textual data stream is processed by a data compression circuit 12. A digital video stream is combined with a watermark signal in an embedding circuit 13 so that the watermark is embedded in a series of video images. A suitable method for the digital watermark is described in Japanese Laid-Open Patent Application 10-155151. The output of embedding circuit 13 is processed by a video compression circuit 14 using a known compression technique such as MPEG-2 to produce an MPEG-2 transport video stream.

The outputs of the audio and data compression circuits 11 and 12 are multiplexed with the MPEG-2 transport video stream by a multiplexer 15 to produce a composite video signal by inserting the textual data into the vertical blanking intervals of the video format and the audio signal into the low frequency region of the spectrum of the composite video signal.

The output of multiplexer 15 is encrypted by an encryption circuit, or encryptor 16. A forward error correction (FEC) encoder 17 is provided for converting the output of the encryptor 16 into a format that allows errors in the transmitted signal to be detected and corrected at the intended receive site. The output of the FEC encoder 17 is converted by an interface 18 to a radio frequency signal and transmitted to the receiver 30 if the intermediate system 20 is a transmission system. If the system 20 is a storage system, the output of the FEC encoder 17 is directly supplied to the storage system and stored in a suitable storage medium.

The signal from the transmitter 10 is received by an interface 31 at the receiver 30 to produce a replica of the output signal of the FEC encoder 17. If the intermediate system 20 is a wireless link, the received signal is down-converted by the interface 31 to the baseband signal and if it is a storage system the stored signal is a baseband signal.

The received baseband signal is applied to an FEC decoder 32 where errors, if present in the received signal, are detected and corrected. The error-corrected signal is decrypted by a decryptor 33 and fed to a demultiplexer 34 to decompose the decrypted signal into the compressed audio, data and MPEG-2 transport video components, which are expanded to the original format by respective expansion circuits 35, 36 and 37.

The text data recovered by data expansion circuit 36 is supplied to a memory or synchronizer 37 and the MPEG-2 transport video stream recovered by the video expansion circuit 38 is supplied to a watermark detector 39 to detect the watermark embedded in the video stream in a manner as disclosed in the aforesaid Japanese laid-open patent application.

The detected watermark signal is used by the memory 37 as a read timing signal for reading the stored text data so that it is synchronized to a series of desired video frames. The detected watermark is also supplied to a copy protect circuit 40 to produce a copy management signal that is used to protect video programs from being illegally copied by unauthorized users. The copy management signal is embedded in the video stream from video expansion circuit 38 as a digital watermark by an embedding circuit 41 to protect a series of video frames from unauthorized duplications.

Figure 2:
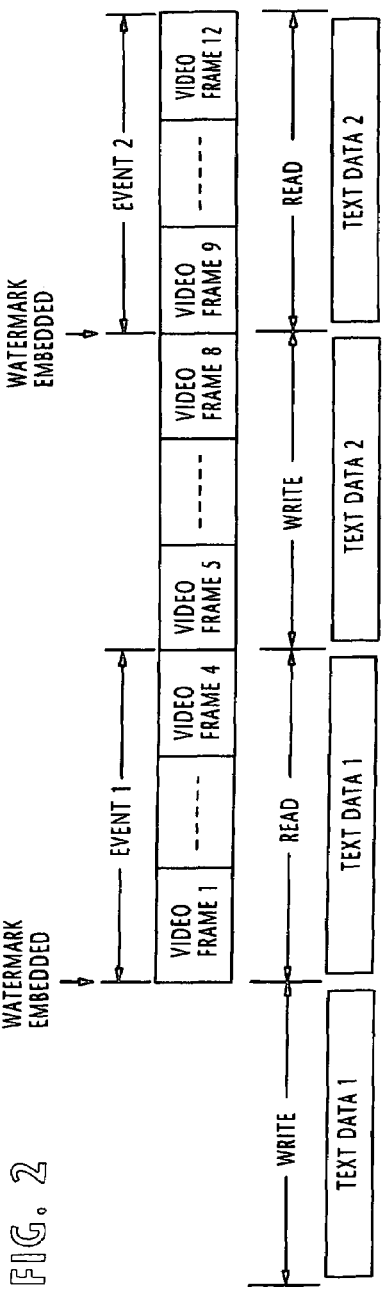
FIG. 2 is a timing diagram of a video stream along with text data which occur at such timing that write and read operations can be performed in an alternate fashion.

An example video stream is shown in FIG. 2 in which multiplexed text data 1 and 2 occur at such timing that the memory 37 can operate alternately in a write mode and a read mode. Two watermark signals are shown embedded in a video stream for synchronizing text data 1 to a series of video frames 1 to 4 (event 1), and synchronizing text data 2 to a series of video frames 5 to 8 (event 2). When the video stream is displayed on the display stream 42, the event-1 video frames 1 to 4 will be overlaid with text data 1 and the event-2 video frames 5 to 8 will be overlaid with text data 2.

Figure 3:
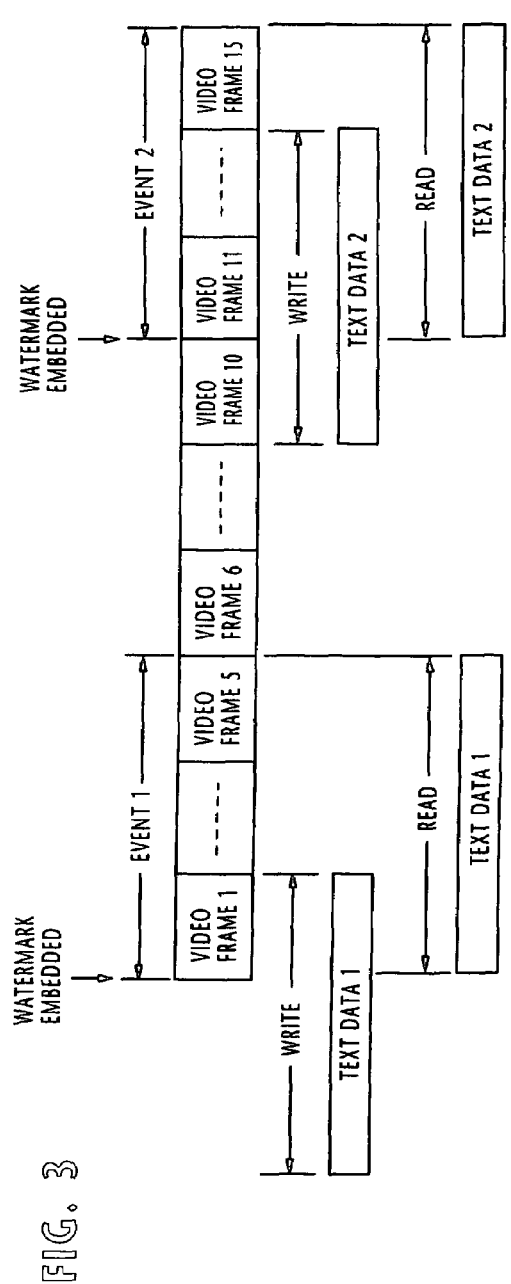
FIG. 3 is a timing diagram of a video stream along with text data which occur at such timing that write and read operations are performed simultaneously by using a dual-mode memory.

Preferably, the memory 37 is of a dual-mode type in which it operates simultaneously in write and read modes. As shown in FIG. 3, this mode of operation is useful when a read operation of text data 1 and 2 is started while they are still written into the memory.

Figure 4:
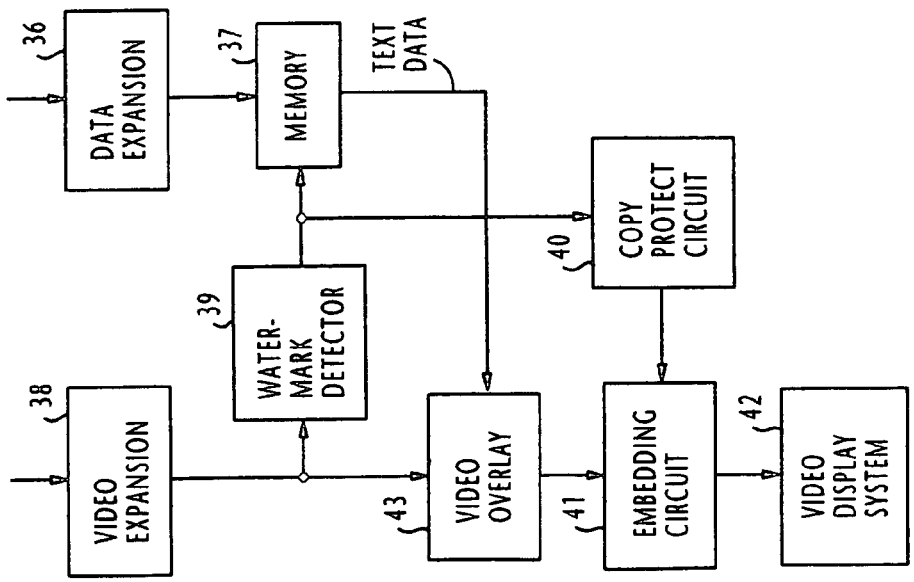
FIG. 4 is a block diagram of a first modified embodiment of the present invention.

In a modified embodiment shown in FIG. 4, a video overlay unit 43 is provided between the video expansion circuit 38 and the watermark embedding circuit 41. Video overlay unit 43 receives the output of memory 37 to superimpose the text data on video frames specified by the detected digital watermark.

Figure 5:
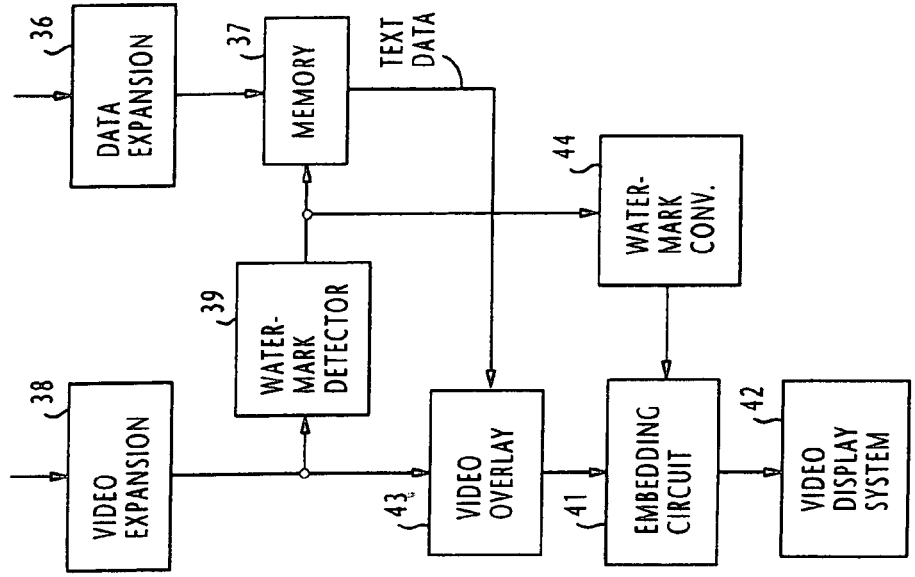
FIG. 5 is a block diagram of a second modified embodiment of the present invention.

In a further modified embodiment shown in FIG. 5, the copy protect circuit 40 is replaced with a watermark converter 44 in which the watermark signal detected by the watermark detector 39 is altered into a form that can be detected as a copy management signal to protect specified video frames from being illegally copied by unauthorized users. The output of watermark converter 44 is combined with the output of video overlay unit 43 in the embedding circuit 41.

If text data 1 and 2 occur in sequence but the read timing of text data 1 coincides with the write timing of text data 2 as shown in FIG. 6, a modification of FIG. 7 is useful. In this modification, two graphic memories 61 and 62 are provided and a write control switch 63 is connected between the output of data expansion circuit 36 and the memories 61, 62 and a read control switch 64 is connected between the memories 61, 62 and the video overlay circuit 43. Memory control switches 63 and 64 are controlled by the output of the watermark detector 39 so that when one of the memories 61, 62 is in a write mode the other memory is in a read mode.

What is claimed is:

1. A digital video communication system comprising:
    at a source site:
        an embedding circuit for embedding a digital watermark in a digital video stream to produce a watermarked digital video stream; and
        a multiplexer for multiplexing a text data stream with the watermarked digital video stream to produce a multiplexed signal, at a sink site:
        a demultiplexer for demultiplexing the multiplexed signal for recovering said watermarked digital video stream and said text data stream;
        a digital watermark detector for detecting the digital watermark embedded in the recovered digital video stream; and
        a synchronizer for synchronizing the recovered text data stream to the recovered digital video stream in response to the detection of said digital watermark.

2. The digital video communication system of claim 1, further comprising a digital overlay circuit for superimposing the synchronized text data stream with the recovered digital video stream.

3. The digital video communication system of claim 1, wherein said synchronizer comprises a memory.

4. The digital video communication system of claim 1, wherein said synchronizer comprises a dual-mode memory.

5. The digital video communication system of claim 1, wherein said synchronizer comprises a pair of first and second memories and a control circuit for alternately operating the first and second memories in write and read modes in response to the detected digital watermark.

6. The digital video communication system of claim 5, further comprising a digital overlay circuit for superimposing the text data stream read out of each of said first and second memories with the recovered digital video stream.

7. The digital video communication system of claim 1, further comprising at said sink site:
    a copy protect circuit responsive to the detected digital watermark for producing a copy management signal; and
    an embedding circuit for embedding the copy management signal in the recovered digital video stream as a second digital watermark for preventing illegal duplication of the digital video stream.

8. The digital video communication system of claim 1, further comprising at said sink site:
    means for converting the detected digital watermark to a second digital watermark; and
    an embedding circuit for embedding the second digital watermark in the recovered digital video stream.

9. The digital video communication system of claim 1, further comprising at said source site:
    a video compression circuit for compressing the watermarked digital video stream to supply an MPEG-2 transport stream to said multiplexer;
    an encryption circuit for encrypting the multiplexed signal; and a forward error correction (FEC) encoder for encoding the encrypted signal, at said sink site,
- an FEC decoder for decoding the encoded signal to recover an encrypted signal;
- a decryption circuit for decrypting the encrypted signal to recover a multiplexed signal of said MPEG-2 transport stream and said text data stream and supplying the multiplexed signal to said demultiplexer, whereby the MPEG-2 transport stream and said text data stream are individually recovered by said demultiplexer, and
- a video expansion circuit for expanding the MPEG-2 transport stream recovered by said demultiplexer to supply a signal corresponding to said watermarked digital video stream to said watermark detector.

10. The digital video communication system of claim 1, further comprising:
- a video compression circuit for compressing the watermarked digital video signal; and
- a video expansion circuit for expanding the recovered watermarked digital video stream.

11. A digital video communication method comprising the steps of:
- a) embedding a digital watermark in a digital video stream to produce a watermarked digital video stream;
- b) multiplexing a text data stream with the watermarked digital video stream to produce a multiplexed signal;
- c) demultiplexing the multiplexed signal for recovering a watermarked digital video stream and a text data stream;
- d) detecting the digital watermark embedded in the recovered digital video stream and using the detected digital watermark as a timing signal for reading the text data from said storage medium; and
- e) synchronizing the recovered text data stream with the recovered digital video stream in response to the detected digital watermark.

12. The method of claim 11, wherein the step (e) comprises storing the recovered text data stream in a memory and reading the stored text data stream from the memory in response to the detected digital watermark.

13. The digital video communication method of claim 11, further comprising the steps of:
- compressing the watermarked digital video signal before multiplexing the watermarked digital video stream with the text data stream; and
- expanding the recovered watermarked digital video stream.

14. A digital television receiver for receiving a digital video signal in which a digital video stream and a text data stream are multiplexed and the digital video stream is watermarked by a digital watermark signal associated with the text data stream, comprising:
- a demultiplexer for demultiplexing the digital video signal for recovering the watermarked digital video stream and the text data stream;
- a digital watermark detector for detecting the digital watermark in the recovered digital video stream; and
- a synchronizer for synchronizing the recovered text data stream to the recovered digital video stream in response to the detection of said digital watermark.

15. The digital television receiver of claim 14, further comprising a digital overlay circuit for superimposing the synchronized text data stream with the recovered digital video stream.

16. The digital television receiver of claim 14, wherein said synchronizer comprises a memory.

17. The digital television receiver of claim 14, wherein said synchronizer comprises a dual-mode memory.

18. The digital television receiver of claim 14, wherein said synchronizer comprises a pair of first and second memories and a control circuit for alternately operating the first and second memories in write and read modes in response to the detected digital watermark.

19. The digital television receiver of claim 18, further comprising a digital overlay circuit for superimposing the text data stream read out of each of said first and second memories with the recovered digital video stream.

20. The digital television receiver of claim 14, further comprising:
- a copy protect circuit responsive to the detected digital watermark for producing a copy management signal; and
- an embedding circuit for embedding the copy management signal in the recovered digital video stream as a second digital watermark for preventing illegal duplication of the digital video stream.

21. The digital video communication system of claim 14, further comprising:
- means for converting the detected digital watermark to a second digital watermark; and
- an embedding circuit for embedding the second digital watermark in the recovered digital video stream.

22. The digital television receiver of claim 14, further comprising:
- a video compression circuit for compressing the watermarked digital video signal; and
- a video expansion circuit for expanding the recovered watermarked digital video stream.

* * * * *